United States Patent [19]

Scarnato et al.

[11] 3,841,070
[45] Oct. 15, 1974

[54] WINDROW PLACEMENT DEVICE AND HARVESTING METHOD

[75] Inventors: Thomas J. Scarnato, Barrington; George B. Cicci, Broadview; Martin H. Meyer, Elburn, all of Ill.

[73] Assignee: International Harvester Company, Chicago, Ill.

[22] Filed: Sept. 25, 1972

[21] Appl. No.: 292,040

Related U.S. Application Data

[63] Continuation-in-part of Ser. No. 277,193, Aug. 2, 1972, abandoned, which is a continuation of Ser. No. 78,721, Oct. 7, 1970, abandoned.

[52] U.S. Cl. .................................. 56/14.4, 56/192
[51] Int. Cl. ............................................ A01d 45/02
[58] Field of Search .................... 56/14.4, 192, 366

[56] References Cited
UNITED STATES PATENTS

| | | | |
|---|---|---|---|
| 2,562,689 | 7/1951 | Baldwin | 56/208 |
| 2,854,046 | 9/1958 | Devorak | 56/192 |
| 3,059,403 | 10/1962 | Bamford et al. | 56/192 |
| 3,092,946 | 6/1963 | Mathews | 56/192 |
| 3,141,284 | 7/1964 | Reynolds | 56/192 |
| 3,523,410 | 8/1970 | Taylor et al. | 56/14.4 |
| 3,651,625 | 3/1972 | Redford | 56/128 |

*Primary Examiner*—Antonio F. Guida
*Attorney, Agent, or Firm*—Dennis K. Sullivan; Floyd B. Harman

[57] ABSTRACT

A windrow forming unit having a crop-material chute with laterally adjustable side panels, a linkage for adjusting the panels to deposit the material in a windrow in selected positions to space the windrows to allow passage of a wheel therebetween of the towing vehicle and also in position to make possible aggregation of two windrows by a conventional rake or conventional regular spacings are conditions require. The harvesting method comprises placing two windrows adjacent and then spacing the next windrow widely from the two and then placing the next windrow closely to the last windrow.

15 Claims, 16 Drawing Figures

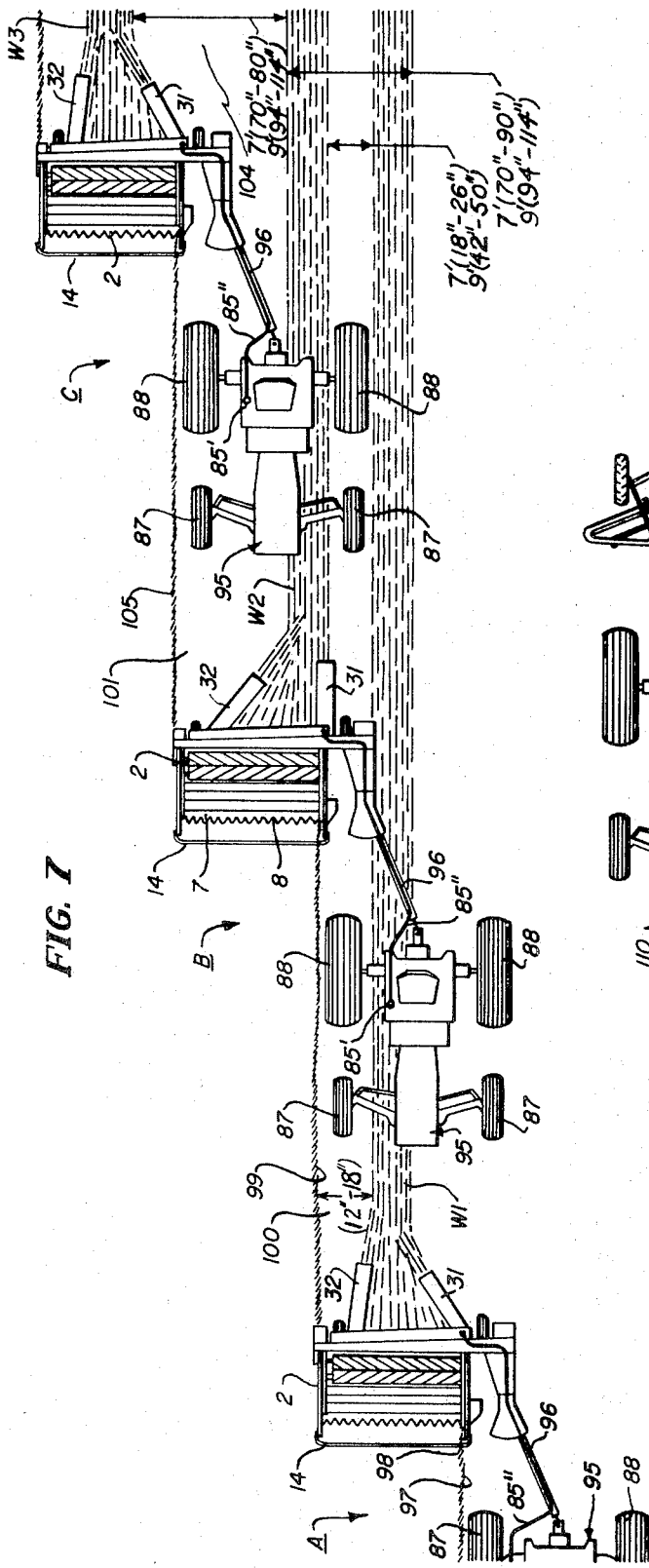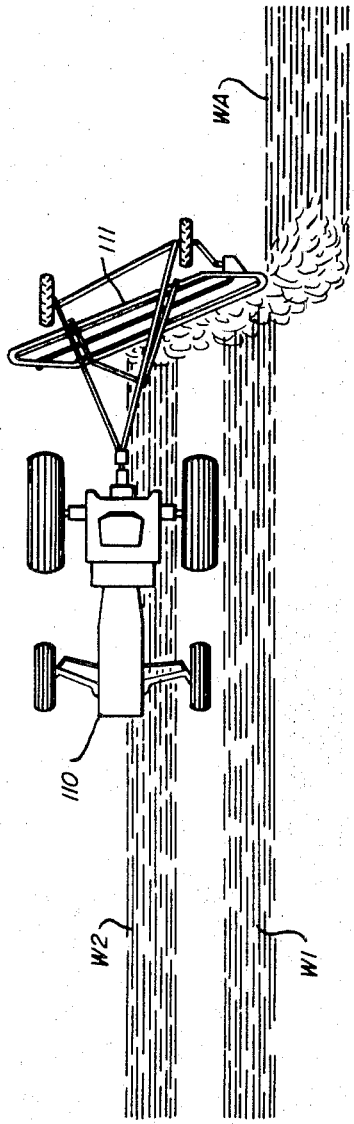
FIG. 7
FIG. 8

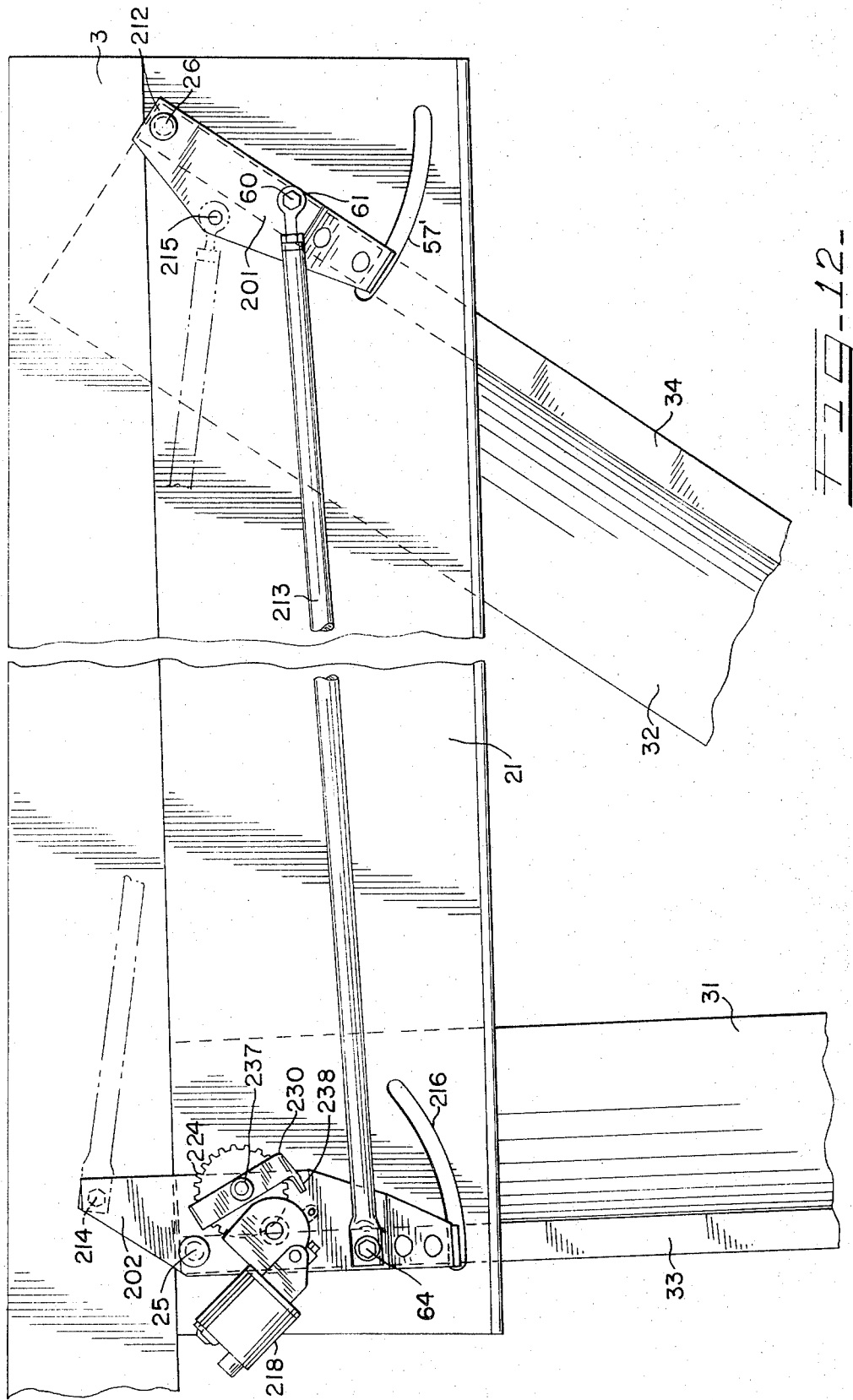

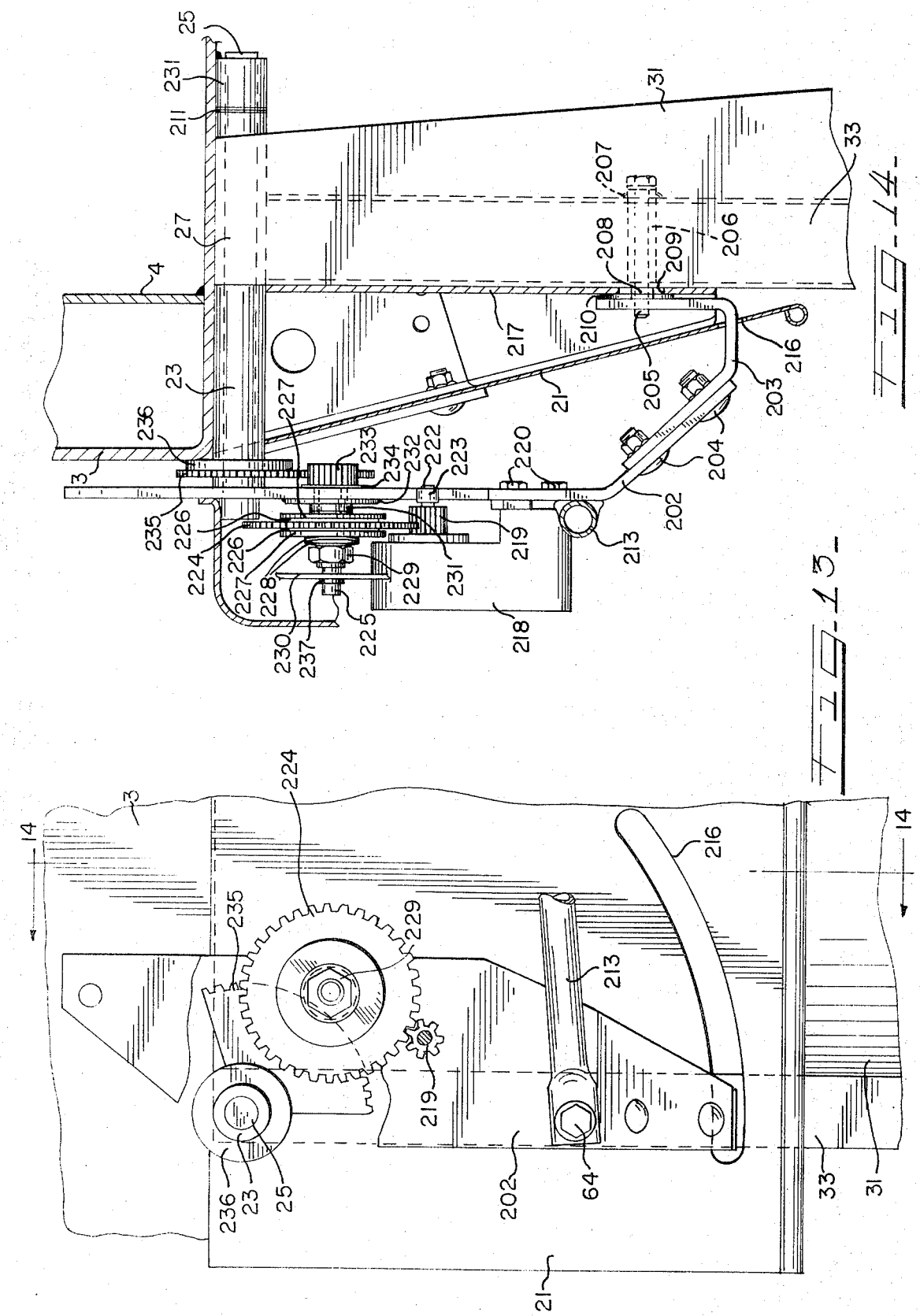

WINDROW PLACEMENT DEVICE AND HARVESTING METHOD

CROSS REFERENCE TO RELATED APPLICATIONS

This application is a continuation-in-part of our application Ser. No. 277,193, filed Aug. 2, 1972, and now abandoned, which in turn is a continuation of application Ser. No. 78,721, filed Oct. 7, 1970, and now abandoned, which are all assigned to the assignee hereof.

DISCUSSION OF THE PRIOR ART

No prior art devices are available which could be operated from the tractor for placing several windrows from a hay conditioner which cut a full swath of hay 7' or 9' in such proximity to each other that they could be aggregated into a single windrow by a single pass over the field with a conventional 7' or 9' rake. The problem inherent in such an arrangement is to insure that the windrows are placed within the span of the rake but far enough apart to permit aeration and provide a path for the tractor wheel so that it will not track over and press the crops onto the ground which the rake will not gather.

Furthermore, such apparatus must not only be convenient to use, but must be positive in action and operate consistently.

SUMMARY OF THE INVENTION

The instant invention, in addition to providing optimum placement of the windrows with minimal foreign matter therein, also reduces the distance which the material must be raked. There is a growing appreciation of the value of harvesting hay with a mower conditioner in that metal particles lying on the ground, when picked up by a mower conditioner, are imparted a sufficient velocity by the conditioning rollers that they are directed into the ground, whereas in prior practice such as raking crops from a swath, the rake sweeps these items into the windrowed material where they are readily lifted by the pick-up reel of the processing machinery with resultant damage thereto.

In the methods heretofore practiced, it required two trips down the field to aggregate two windrows into a single windrow, which was not only costly from the point of equipment use and time, but caused the material to be moved longer distances on the ground thus mixing in more dirt and debris and also losing the valuable leaves.

In operating on hillsides no control of the windrow placement was possible since the material would tend to roll downhill into the other cut or uncut material and which is now controlled with the instant invention.

The invention is directed to a novel windrow placement device particularly adaptable, but not exclusively restricted to use with a mower-conditioner.

A general object of the invention is to provide a novel remotely actuated windrow placement device to readily permit aggregation and thus minimize raking of the crops.

More specifically the invention comprehends the provision of a pair of deflector shields at the discharge of a crop harvesting device swingable about vertical axes and remotely controlled from the operator's station to deflect the crops to one side or the other of the machine so as to group the windrows in an arrangement conducive to gathering the crops in a later operation.

The invention also contemplates a novel arrangement of linkages for selectively swinging both deflectors laterally or toward and away from each other.

A broad object of the invention is to devise a method of crop handling which minimizes the work for one man operation.

These and other objects and advantages inherent in and encompassed by the invention will become more apparent from the specifications and the drawings, wherein:

FIG. 7 illustrates the position of the harvesting unit in association with a towing tractor showing the disposition of the windrowing mechanism as well as the tractor with respect to windrows illustrating the formation of three consecutive windrows and their placement;

FIG. 8 illustrates a tractor with a side delivery rake operating on the previously formed windrowers in order to aggregate them;

FIG. 12 is an enlarged top plan view of the rear portion of the machine shown in FIG. 1 with parts broken away but showing an alternative form of windrowing apparatus;

FIG. 13 is an enlarged top plan view of a portion of the windrowing apparatus shown in FIG. 12 but with the actuating motor removed to illustrate the gear arrangement; and FIG. 14 is a sectional view taken substantially on line 14—14 of FIG. 13.

Figure 1:
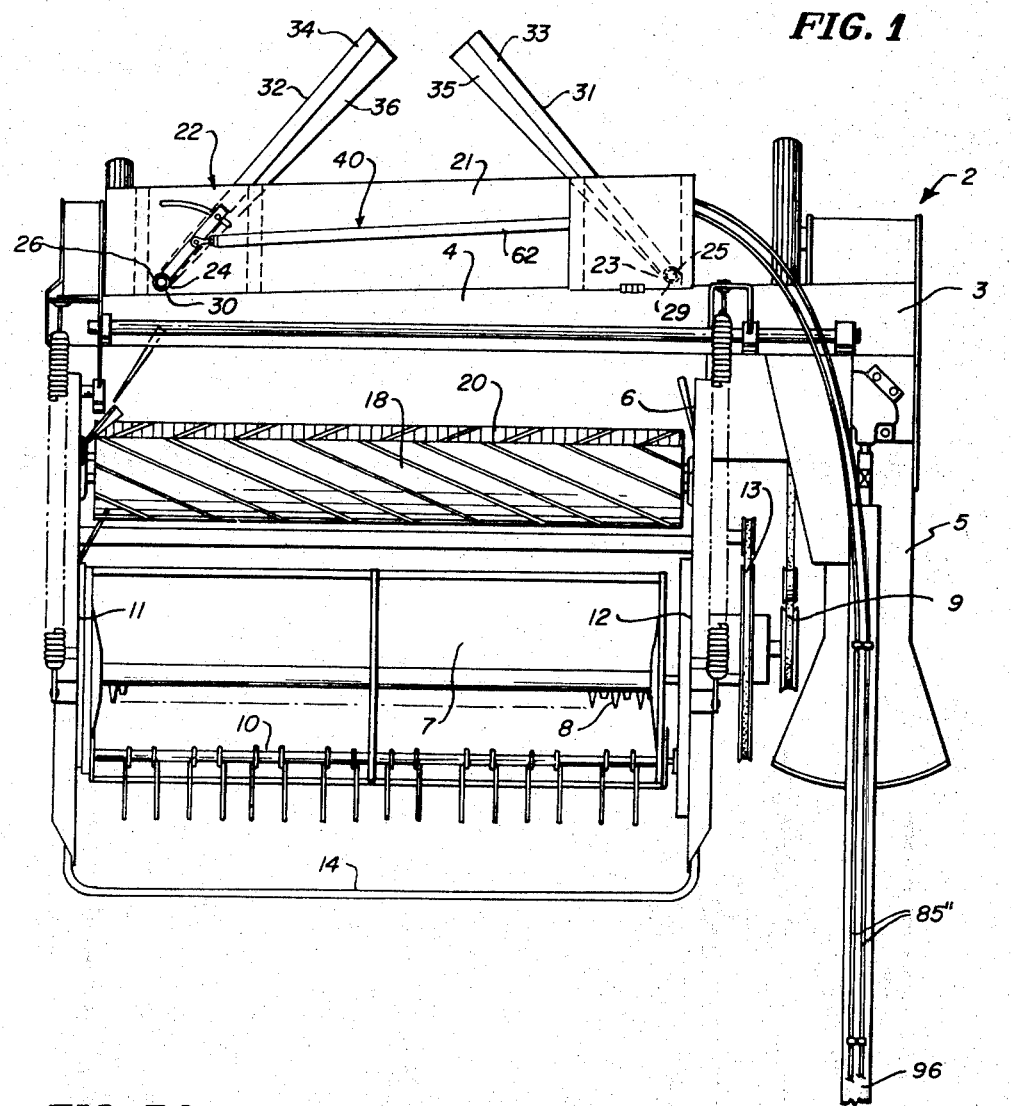
FIG. 1 is a top plan view of the harvesting machine incorporating the invention.
Figure 3A:
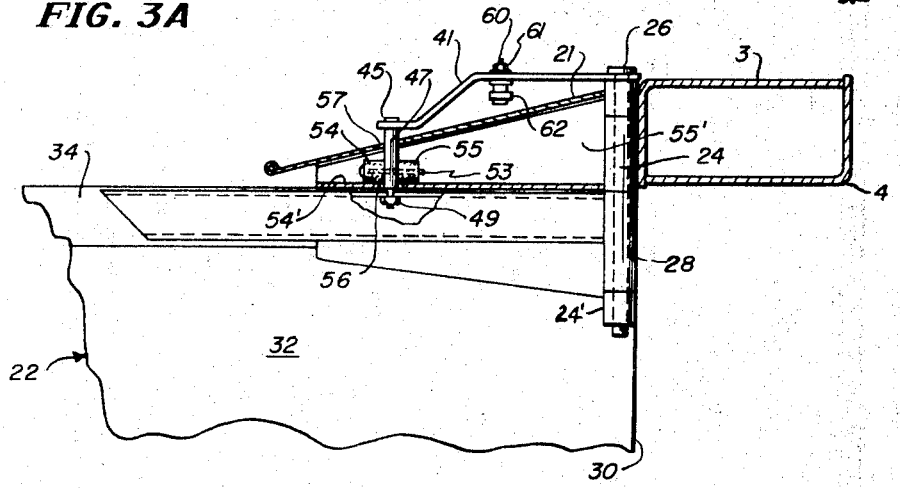
FIG. 3A is a sectional view taken substantially on line 3A—3A of FIG. 2.
Figure 2:
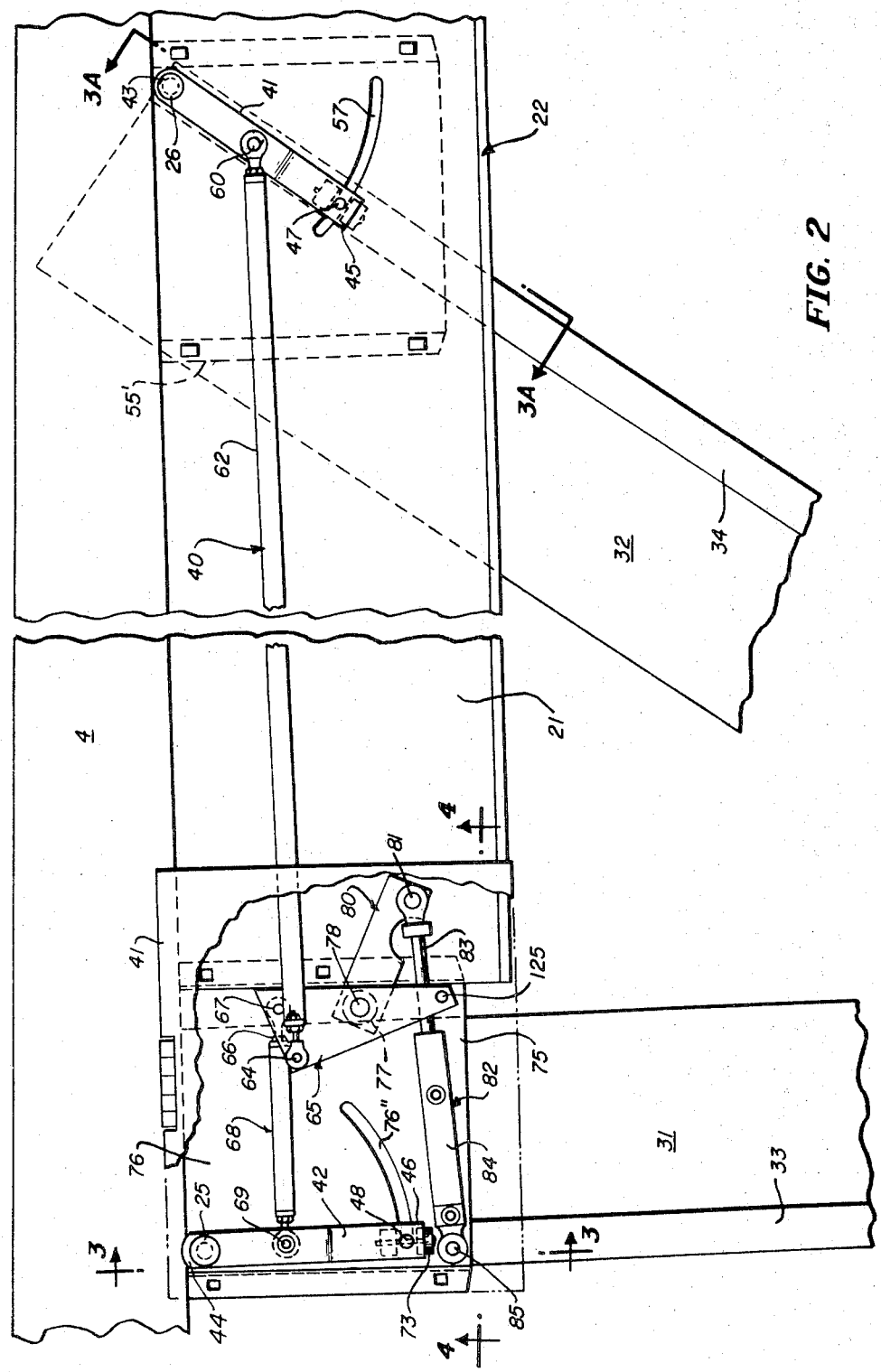
FIG. 2 is an enlarged top plan view of the rear portion of the machine shown in FIG. 1 with parts broken away.
Figure 3:
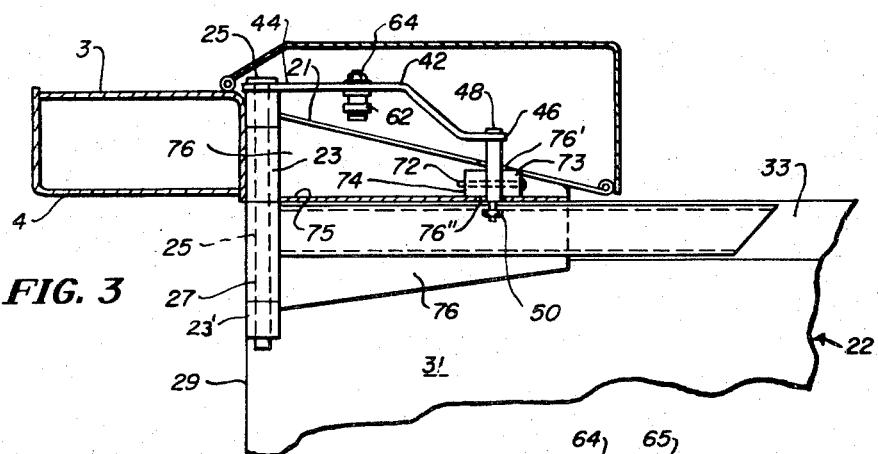
FIG. 3 is a cross sectional view taken substantially on the line 3—3 of FIG. 2.
Figure 4:
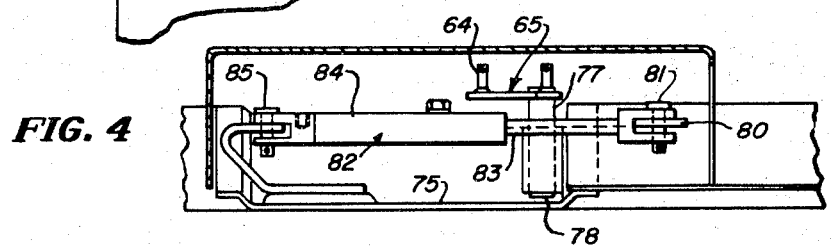
FIG. 4 is a further sectional view taken substantially on the line 4—4 of FIG. 2.

The harvesting machine generally designated 2 is of the type more adequately described in Thomas Scarnato et al. U.S. application filed Feb. 5, 1970, now U.S. Pat. No. 3,670,483, and it comprises frame structure 3 which has a transverse member 4 and a longitudinal member 5. Sub-frame structure 6 is suitably mounted from the frame 3 and there is a platform 7 at the front end of which there is provided a mowing device 8 driven from a drive train 9. There is also provided a reel 10 which is carried from the side members 11 and 12 of the platform driven by the power train 13. The reel is operative to sweep a swath of uncut crops which are bent forwardly by the prostrating bar 14 mounting on the frame ahead of the reel. The swath, which is gathered and moved rearwardly by the reel, is presented to the sickle or cutting apparatus 8; then after the crop is cut, the reel moves the crop over the platform 7 into a pair of transverse crushing rollers 18 and 20, which rollers discharge the material forceably under a top shield 21 of a windrowing device generally designated 22. The top shield or baffle 21 extends rearwardly from the transverse beam member 4 to which it is connected and slopes downwardly and rearwardly. On opposite sides of the harvesting machine there are connected to the member 3 upper and lower hinge elements 23, 23', 24, and 24'. These hinge elements provide supports for vertical pintles 25, 26 which extend through the hinge sleeves 27 and 28 which are fixedly secured to the forward edges 29 and 30 of left and right side shields 31 and 32 respectively. The side shields or guides 31 and 32 are formed with upper edge channeled sections 33 and 34 to rigidify the structure and the shields gradually slope inwardly toward their lower ends 35 and 36 in order to assist the material, which is being discharged forceably by the conditioning rollers and glancing off the bottom side of the deflector shield 21, to fold together into a windrow.

As best seen in FIGS. 2, 3, 3A and 4, a novel windrow side sheet operating device has been provided generally designated 40. This device comprises right and left swing links 41 and 42 which are pivoted at their forward ends 43 and 44 on the pintles 26 and 25 and at their rear ends are connected as at 45 and 46 to the upper ends of guide pins 47 and 48. The lower ends of the guide pins are secured as by bolting or welding at 49 and 50 (FIGS. 3 and 3A) to the channel sections 34 and 33. The pin 47 is provided adjacent to its lower end with a transverse horizontal shaft 53 which carries a pair of rollers 54 and 55, preferably of plastic material such as nylon, which ride upon the top surface 54' of an auxiliary horizontal plate extension 55' which is formed integral with the frame member 4 and extends rearwardly therefrom. The lower end portion of the pin 47 extends through an arcuate slot 56 in the plate extension 55' and through a vertically aligned similar arcuate slot 57 in the top deflector plate 21. The arcs are struck from the axis of pivot of the pin 26. Thus the side deflector, that is the right deflector 32, is supported intermediate its ends from the rollers 54 and 55 as the deflector 32 swings laterally in a horizontal plane.

Figure 5:
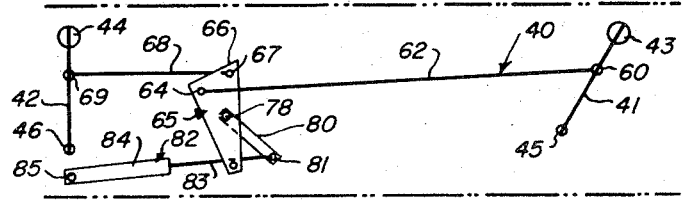
FIGS. 5 and 5A illustrate diagrammatically two different positions of the linkage and the windrowing apparatus with the links connected in a first position.

The link 41 is pivotally connected intermediate its ends by a pin 60 to an adjustable clevis 61 which is mounted on one end of a motion transfer bar or rod 62, said bar extending to the leftward end of the machine and thereat being pivoted (FIGS. 2, 5 and 5A) to a pin 64 fastened adjacent to one end 66 of a generally horizontal triangular shaped lever 65. The end 66 of the lever 65 is also provided with a pin 67 which is connected to one end of an adjustable link 68 which is pivotally connected at its other end as at 69 to the swing link 42 intermediate the ends thereof, said link 42 having its forward end 44 pivoted on the pintle 25 and at its rear end being connected at 46 to the aforesaid pin ends with a cross shaft 72 (FIG. 3) which mounts at opposite sides of pin 48 rollers 73 and 74 which ride on the top surface 75 of a rear extension 76 of the frame member 3. The pin 48 extends through arcuate concentric vertically aligned slots 76' and 76'' in top shield 21 and plate 76. These slots 76' and 76'' are struck from pintle 25.

The lever 65 is connected to a sleeve 77 (FIG. 4) intermediate its ends and the sleeve 77 pivots on a pin 78 which is secured to the plate member 75. The sleeve 77 is connected to an arm extension 80 (FIG. 2) which projects inwardly from the leftward end of the machine and such arm 80 is pivotally connected as at 81 at its distal end to one end of a double acting or two-way linear actuator or operator generally designated 82 and in the present instance shown to be the piston rod 83 which telescopes within a cylinder 84, the cylinder being anchored pivotally as at 85 to an anchor on the frame element 75. It will be seen that in the position of the parts shown in FIG. 2, as well as in FIGS. 5 and 5A, the linkage is so arranged that both side sheets 31 and 32 swing simultaneously in the same direction and thus place the windrow to the left of the longitudinal center line of the machine when the rod 83 is extended whereby the rod 62 interconnecting the two side sheets is pulled leftwardly and the rod 68 is also moved leftwardly whereby the swinging links 41 and 42 also swing leftwardly carrying the side sheets 31 and 32 in a leftward direction. The linkage is so arranged and the adjustability of the clevis ends on the rod 62 as well as the rod 68 is such that the rightward side sheet swings to a position approximately that shown in FIG. 2 and the left sheet assumes a substantially fore and aft position. This geometry is adequately shown in FIG. 5.

Figure 5A:
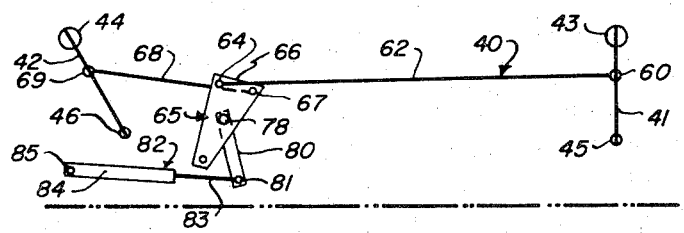

In FIG. 5A the position of the selectively reconnectible parts of the linkage are shown where the windrow is formed to the right of the center and in such position the actuator 82 is telescoped or retracted and the lever 65 rotates in a clockwise rotation and both of the rods 62 and 68 move rightwardly and swing links 41 and 42 swing rightwardly therefore the side sheet 32 assumes a substantially fore and aft position and the guide sheet 31 is angled laterally. Of course it will be realized that the extent to which these two side sheets move is dependent upon the operator who actuates the lever or remote control 85' on the tractor in the intended direction to port the fluid into a cylinder through the hydraulic lines 85'' (FIG. 7).

As best seen in FIG. 7, a tractor shown at 95 is connected to the tow bar 96 of the unit 2 and the unit is offset laterally with respect to the rightward or cropward front and rear wheels 87, 88 to cut a swath which is the width of the harvester. In the illustration in FIG. 7, the tractor designated A is positioned outside the edge 97 of the standing crop designated 98. In this first pass the leftward side shield 31 is angled toward the center of the harvester and the rightward side 32 sheet is substantially fore and aft and thus the windrow designated W1 is shifted mostly right of center of the unit. In the second pass of the harvester and tractor unit seen at B in FIG. 7, the uncut edge of the crop is shown at 99 and the right and left front wheels 87 and right and left rear wheels 88 of the tractor straddle the windrow W1 and the rightward wheels 87 and 88 run in the path designated 100. The unit shown at B is cutting a swath immediately thereahead and in this cut or run, the rightward side shield 32 is angled toward the center and the leftward shield is substantially fore and aft so that the windrow designated W2 is shifted over to the left of center of the unit and is disposed closely adjacent to the windrow W1 except for the path designated at 100.

On the third pass of the unit shown at C, the leftward wheels 87 and 88 of the tractor run in path 100 and the wheels straddle the windrow W2 and the rightward wheels 87 and 88 of the tractor 95 run in the path designated 104 which is between the windrow W2 and the edge 105 of the remaining standing crop. The unit C is cutting the swath the width of the unit 2 and in this run, the leftward side shield or sheet 31 is angled toward the center whereas the rightward sheet 32 is substantially fore and aft and the windrow W3 is formed to the right of center and there is a very large spacing as shown at 104 between the windrow W2 and the windrow W3. The next run of the unit would be the same as that shown at B. In other words, the rightward side sheet 32 would be angled toward the center and the leftward 31 would be straight ahead or generally parallel to the direction of movement. Thus the windrows are formed in pairs closely spaced and then next the windrow will be spaced far apart from the two. The windrows thus are placed in series of pairs, the windrows of each pair being closely spaced but widely separated from the next pair.

From FIG. 7 it will be seen that with a 7 foot mower conditioner, the spacing between adjacent windrows W1 and W2 is from 18 inches to 26 inches, the distance between remote sides of windrows W1 and W2 is from 79 inches to 90 inches and the spacing from W2 to W3 is from 70 inches to 80 inches. With a 9 foot mower conditioner, the spacing between W1 and W2 is from 42 inches to 50 inches; the distance between the remote sides of W1 and W2 is 94 inches to 114 inches and between W2 and W3 the spacing is 94 inches to 114 inches (FIG. 7).

Thus a seven foot rake 111 is capable of aggregating windrows W1 and W2 as seen in FIG. 8 into a single windrow WA.

In FIG. 8, a trailing nine wheeled rake 115 pulled by tractor 110 is shown aggregating windrows W1, W2 and W3, placed only by a 7' mower conditioner into a single windrow WA.

Figure 10:
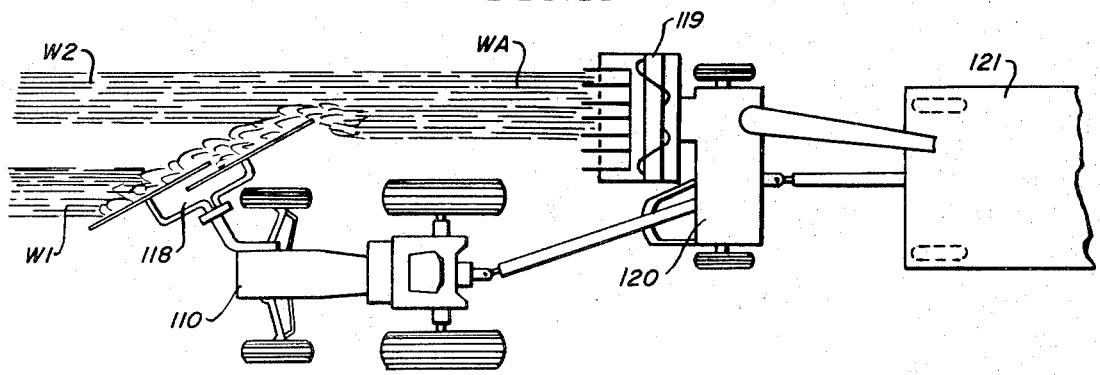
FIG. 10 illustrates the combination of a windrow turner or wheel rake to aggregate the two adjacent windrows for delivery to the pick-up of a conventional forage harvester.

In FIG. 10 there is shown a tractor 110 with a front mounted wheel rake 118 aggregating windrows W1 and W2 to feed a pick up 119 of a forage harvester 120 trailingly connected to the tractor and discharging into a forage wagon 121 connected to the forage harvester.

Figure 11:
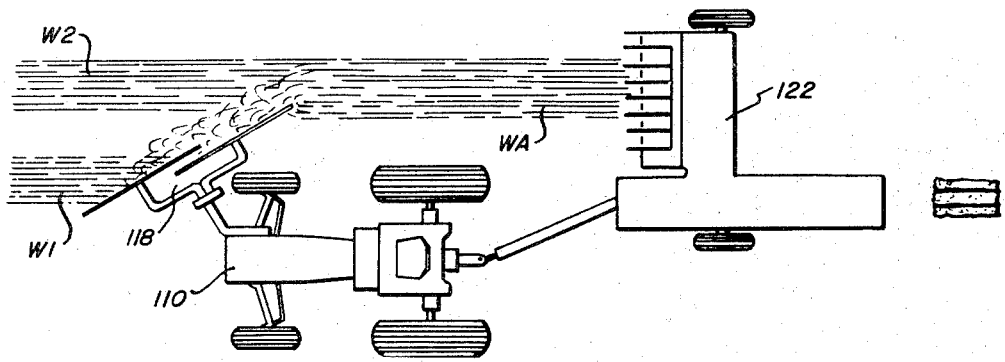
FIG. 11 illustrates the arrangement of a windrow turner or wheel rake at the front of the tractor aggregating an adjacent windrow to a single windrow for alignment with the pick-up of a baler.

In FIG. 11 there is shown a tractor 110 with a front mounted rake 118 aggregating windrows W1 and W2 to feed to a pick up of a baler 122 connected to the tractor.

Thus in each instance a single pass of the rake aggregates at least two windrows for easy handling by the harvesting equipment.

Figure 6:
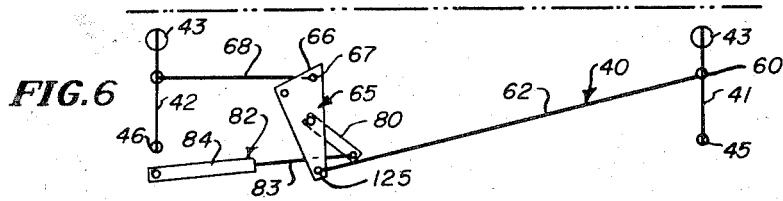
FIGS. 6 and 6A illustrate the linkage connected in a second position and showing different positions of the parts.
Figure 6A:
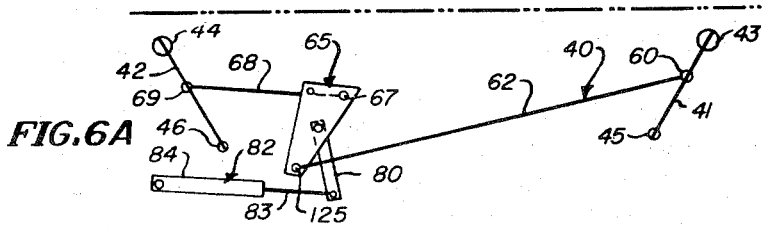
Figure 9:
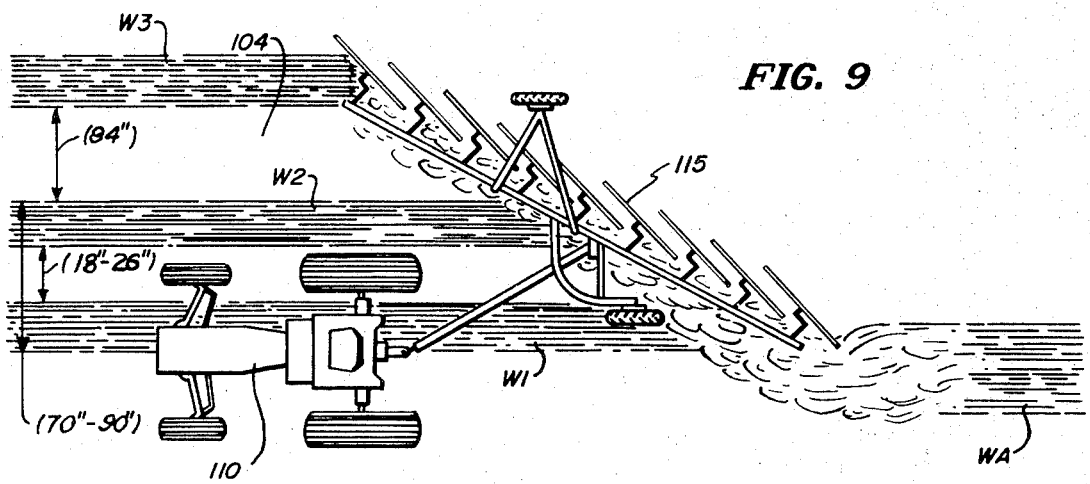
FIG. 9 shows a tractor with a wheel-type rake aggregating three windrows.

In FIGS. 6 and 6A the connection of the tie bar 62 is between point 60 of link 41 and a point 125 on the rear end of lever 65. Thus actuation of the operator 82 causes the side sheets 31 and 32 to converge or diverge upon contraction and extension of the operator 82 to form a windrow or a swath, respectively.

Thus the linkage is optionally easily connectible to the operator's requirements.

THE EMBODIMENT OF FIGS. 12–14

In the embodiment of the invention shown in FIGS. 12 to 14, the windrow side sheet operating device takes the form of a rotary electric motor and gear and linkage means to position the side sheets. This device comprises left and right swing links 201 and 202 which are pivoted on pintles 25 and 26. Although the shapes of the swing links 201 and 202 have different configurations, their mounting to the side sheets 31 and 32 is identical and thus will be described for the left swing link 202 only.

As shown in FIG. 14, the swing link 202 is connected at its rear end to the upper end of bracket 203 by bolts 204, the intermediate portion of bracket 203 passing through a vertically aligned arcuate slot 216 (57' for the right swing link) concentric about the pintle 25 in the top deflector plate 21. The lower end of bracket 203 is connected to bolt 205 which extends through spacer 208 and sleeve 206 which is welded to the channel section 33 of side sheet 31 at 207. The bolt 205 and spacer 208 extend through an arcuate slot 209 concentric about the pintle 25 in an auxiliary horizontal plate extension 217 attached to frame 3 and through a glide pad 210, made preferably of plastic material such as nylon, to the lower side of the bracket 205. Thus the side sheets 31 and 32 are supported intermediate their ends from the glide pads 210 as the side sheets 31 and 32 swing laterally in a horizontal plane about the pintles 25 and 26 respectively. It is preferable that the windrow side sheet hinge sleeves 27 and 28 be held in close proximity to the upper hinge elements 23 and 24 in order to minimize the load imposed on the glide pads 210. This may be accomplished by the addition of one or more shims 211 as needed between the side sheet hinge sleeves 27 and 28 and the lower hinge elements 23' and 24'.

The right swing link 201 is pivoted on pintle 26 at its forward end 212 and is pivotally connected intermediate its ends by a pin 60 to an adjustable clevis 61 which is mounted on one end of a motion transfer bar 213, said bar extending to the leftward end of the machine and thereat being pivoted to a pin 64 fastened to the left swing link 202 at a point between the pintle 25 and its rearward end. In this configuration, rotation of the side sheet 31 will cause the side sheet 32 to rotate in the same direction and it is preferable that the radius between the pintles 25 and 26 and the pins 60 and 64 be approximately equal.

If it is desired for the side sheets to rotate in opposite directions, the transfer bar 213 may be pivoted on the left swing link 202 forward of the pintle 25 as at 214, as is shown in phantom in FIG. 12, with the location of the pin 60 on the right swing link 201 preferably also being adjusted to 215 to maintain an equal radius of the pivots 214 and 215 from the respective pintles 25 and 26.

The windrow sheet actuating assembly comprises an electrical motor 218 suitably connected through control means such as a switch (not shown) to the tractor battery, the motor being mounted on the left swing link 202 as by bolts 220. A drive gear 219 is fixedly mounted on the output shaft 222 of the motor which extends into a bushing 223 pressed into the swing link 202. The drive gear 219 is matingly engaged with gear 224 which is mounted on pinion shaft 225 by means of a friction clutch assembly comprising rubber washers 226 which are held at either side of gear 224 by retaining washers 227 which may be keyed to shaft 225. Belleville springs 228, which are flattened by nut 229 on pinion shaft 225, provide sufficient force to clamp the retaining washers, rubber washers and gear against bearing 231 while allowing gear 225 to slip if the loading on its teeth becomes too heavy as by the side sheets being jammed. A bracket 230 is mounted on pinion shaft 225 through bushing 237 on the bracket and is fixed to the swing link 202 as at 238 to provide vertical stability for the pinion shaft assembly.

The pinion shaft 225 extends through bearing 231 which is pressed into the swing link 202 and plate 232 welded thereto to provide added thickness to mount the bearing. Pinion gear 233 is fixedly mounted to pinion shaft 225, a retainer washer 234 being interposed therebetween to insure clearance between the pinion gear and the outer flange of the bearing 231. The pinion gear 233 is matingly engaged with gear quadrant 235, which is fixedly mounted as by bolting or welding to plate 236, which is in turn welded to the frame structure 3 and the hinge element 23.

In accordance with the invention when the electric motor is actuated, the pinion gear 233 is caused to rtate about the gear quadrant 235 causing the rotate swing link 202 and side sheet 31 to rotate about the pintle 25 and the right swing link 201 and side sheet 32 to rotate about pintle 36. Thus the embodiment of FIGS. 12 – 14 provides an electrical means of adjusting the windrow side sheets which is easily controllable by the operator while forming windrows and also provides side sheet linkage which is easily adjustable to the operator's requirements.

We claim:

1. A harvesting machine, frame means, harvesting means comprising cutting means mounted on the frame means for cutting swaths of crops, by a for moving the harvested crops in an upward and a rearwardly directed stream, windrowing means on the frame means comprising a horizontally extending top shield on the frame means extending rearwardly of the stream for downwardly guiding the directed stream of crops, a pair of transversely spaced windrow forming generally vertically extending side sheets pivotally mounted on said frame means for laterally guiding the stream of crops, a linkage operatively interconnecting said side sheets, said linkage comprising a swing link pivoted on said frame and link connecting means connecting said swing link to one of said side sheets, a second swing link pivoted on said frame and link connecting means connecting said second link to the other of said side sheets, and a bar pivotally connecting said swing links at points displaced from the pivots of the respective swing links, and rotary actuating means operatively connected to said linkage for positioning said side sheets in selected laterally displaced positions for depositing the crops in windrows, said rotary actuating means comprising an electric motor having an output shaft and mounted on one of said swing links, a drive gear fixedly attached to said output shaft, a spur gear matingly engaged with said drive gear, means for mounting said spur gear to a pinion shaft rotatably mounted to one of said swing links, a pinion gear affixed to said pinion shaft, and a gear affixed relative to said frame and matingly engaged with said pinion gear.

2. The invention according to claim 1 wherein said means for mounting said spur gear to said pinion shaft comprises a friction clutch assembly.

3. The invention according to claim 1 wherein said link connecting means comprise a bracket connected to said swing link and passing through an arcuate slat in said top shield, means connecting said bracket to said side sheet and passing through an arcuate slot in a horizontal plate and extending from said frame and through a glide pad extending on both sides of said slot, said glide pad being interposed between said plate and said bracket to bear a portion of the load of said side sheet.

4. The invention according to claim 3 further comprising means for providing optional connections for said bar to said swing links to permit said side sheets to be rotated in the same and opposite directions to each other.

5. In a harvesting machine, a frame means, harvesting means comprising cutting means elongated transversely of the path of travel of the harvester mounted on the frame means for cutting swaths of crops, means for moving harvested crops in an upward and rearwardly directed stream, windrowing means on the frame means comprising a horizontally extending top shield on the frame means extending rearwardly of the stream for guiding the directed stream of crops downwardly and rearwardly, a pair of transversely spaced windrow forming generally vertically extending side shields pivotally mounted on said frame means for laterally guiding the stream of crops, selectively conditionable operating means connected to said side shields having a first position for simultaneously pivoting both of said side shields toward and away from each other and having a second position for simultaneously swinging both of said side shields laterally conjunctively for selectively depositing the crops in windrows at different transverse spacings relative to said frame means, and operator controlled means for remotely controlling the position of said side shields while the harvesting machine is traveling over the field operatively connected to said operating means.

6. The invention in accordance with claim 5 wherein said operating means comprises a linkage means having selectively reconnectable parts, said second position operatively interconnecting said side shields at certain pivot points for moving the same laterally conjunctively and said first position in which said parts are connectable with different points of pivot to move the shields toward and away with respect to each other.

7. The invention in accordance with claim 6 wherein said operating means comprises a linear actuator mounted on the frame means and connected to said linkage means.

8. The invention in accordance with claim 7 wherein said linkage means comprises a lever pivoted on the frame means and pivotally connected to said actuator, rod means extending between said shields and pivotally connected to said lever, and means pivotally connecting each shield to the rod means at a point displaced from the pivot of the respective shield.

9. The invention in accordance with claim 7 wherein said linkage means comprises a lever pivotally mounted intermediate its ends on said frame means and pivotally connected at one end to said actuator, and rod means pivotally connected at one of their ends to the other end of said lever at one side of the axis of pivoted lever and each operatively connected to a respective side shield at a point spaced from its pivot to the frame means.

10. The invention according to claim 7 and said linkage means comprising a pair of swing links pivotally connected at one end on the axis of pivot of the respective side shield, a pin connected to the upper portion of each side shield and projecting through an arcuate slot in the top shield concentric with the axis of pivot of the respective shield and pivotally connected to the rear end of the adjacent swing link, a rod pivoted at one end of each link intermediate its ends, a lever pivoted to the frame, means pivotally connecting said actuator to said lever, and means pivotally connecting the other end of said rods to the lever.

11. The invention according to claim 10 and a pair of rollers mounted on each pin on opposite sides of the respective slot for rotation about a substantially horizontal axis and upon said top shield.

12. The invention according to claim 10 and means providing an optional connection for said other end of one of the rods to the lever on one side of the axis of pivot thereof and the other rod on the opposite side of said axis to effect movement of the shields toward and away from each other.

13. The invention according to claim 10 and said actuator connected to said lever at a point at one side of the axis of pivot of the lever.

14. A crop harvesting apparatus having means for harvesting and discharging crops in a rearward trajectory at relatively high velocity and having means for windrowing the crops comprising a top baffle and a pair of side guides pivotally mounted on upright axes, selectively conditionable operating means having a first operational position for selectively moving said side guides toward and away with respect to each other in converging and diverging relation and a second operational position for moving the guides conjunctively in the same direction laterally of said trajectory, and operator remote control means for operating said operating means to simultaneously move said side guides in accordance with the operator's command while the harvester is in operation across the field.

15. A crop harvesting apparatus having means for discharging crops in a rearward trajectory at relative velocity and having means for windrowing said crops comprising a top baffle and a pair of side sheets pivotally mounted on upright axes, rotary motor actuating means for selectively swinging said side sheets relative to each other laterally of said trajectory, linkage operatively interconnecting said side sheets for effecting movement of same, and operator means remote from said rotary motor actuating means for operating the same to swing said side sheets in accordance with the operator's control, said rotary motor actuating means comprising a rotary motor and gear means interconnected therewith, and said motor being movably mounted relative to said frame, said gear means comprising an output gear on said motor and a gear fixed to said frame concentric with one of said upright axes, the later gear being adapted to resist driving torque transmitted thereto by said output gear to cause said motor to be rotated about said one axis upon actuation thereof.

* * * * *